W. A. JACKSON.
TRACTOR STEERING CONTROL FOR PLOWING.
APPLICATION FILED SEPT. 2, 1919.
1,349,342.   Patented Aug. 10, 1920.
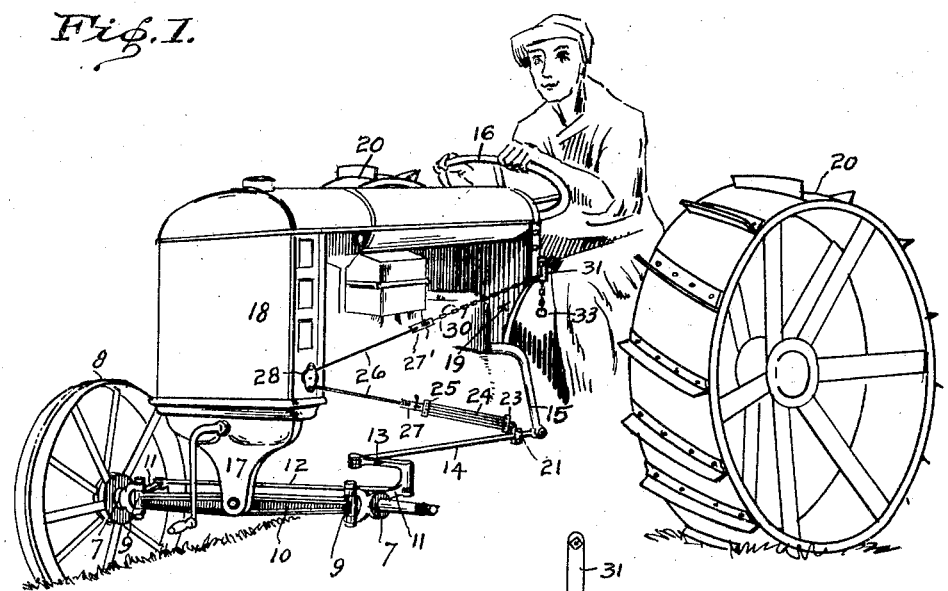
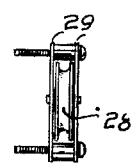
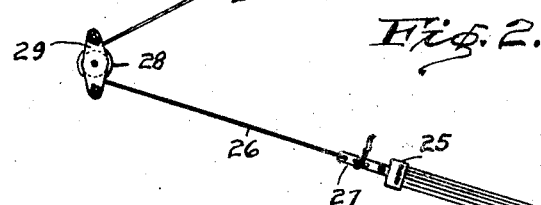
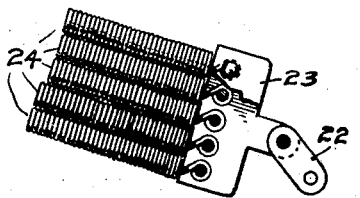
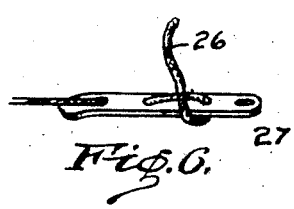
Inventor,
Walter A. Jackson
By Joseph A. Minturn
Attorney.

UNITED STATES PATENT OFFICE.

WALTER A. JACKSON, OF LAUREL, INDIANA.

TRACTOR-STEERING CONTROL FOR PLOWING.

1,349,342. Specification of Letters Patent. Patented Aug. 10, 1920.

Application filed September 2, 1919. Serial No. 321,199.

*To all whom it may concern:*

Be it known that I, WALTER A. JACKSON, a citizen of the United States, residing at Laurel, in the county of Franklin and State of Indiana, have invented a new and useful Tractor-Steering Control for Plowing, of which the following is the specification.

This invention while applicable to various types of tractors for use on the farm in plowing was particularly designed as an attachment to the "Fordson" tractor, and while I have used it principally in plowing it is not intended to limit its use, and where so described in this specification it will be understood as so used only by way of illustration.

In the use of a tractor for plowing—that is, for breaking up the ground for seeding, where two front steering wheels are used with a pair of larger rear traction wheels, the tendency of the side pressure is to cause the front wheels to turn in onto the plowed ground, which, of course, is undesirable for many reasons.

The object of this invention is to provide an attachment which may be easily applied and removed, and which will exert a force, subject to easy regulation by the plowman, to resist this tendency of the front wheels to turn in, but which will apply the force elastically to enable the wheels to turn away from a stump, boulder or other irregularity of the ground, but which will then immediately return them to a normal position with the inner or furrow wheel close against the land side of the furrow, in which furrow this wheel tracks.

I accomplish the above principal object, and other minor ones which will hereinafter appear, by the mechanism illustrated in the accompanying drawing, in which—

Figure 1 is a perspective view of the related parts of a tractor with my invention applied thereto and in operative position, the near front wheel being removed from its axle to show the parts which would otherwise be hid. Fig. 2 is a view in side elevation of the invention removed from the tractor but assembled in operative position. Figs. 3 to 6, inclusive, show details of the mechanism in enlarged views and changed positions to aid the following description.

Like characters of reference indicate like parts in the several views of the drawing.

Referring to Fig. 1 of the drawing, stub-axles 7, 7, on which the front wheels 8 (the far one only being shown, the near one being removed to disclose the parts beyond) known as the steering wheels, are mounted, are connected by knuckles 9, 9, with a front axle 10. Each stub-axle has a rear horizontal arm 11, 11, which are connected by a rod 12, whereby both wheels will be simultaneously adjusted. The adjustment is made through arm 13 which is connected by a drag-link 14 with a crank-arm 15. The latter is oscillated by the usual mechanism (not shown) and a hand steering-wheel 16. A bracket 17 pivoted to axle 10 supports a radiator 18 and front end of the tractor. A dash 19 is immediately in front of the operator seated between the rear traction wheels 20, 20.

All of the above parts are of well known or any suitable construction.

My attachment clamps to the drag-link 14, extends forward to and includes a sheave and block fastened to the radiator casing or other part of the front of the machine and is locked to the dash. It is in effect a cable passing around the sheave, with one end fastened to the drag-link, and the other to the dash; with means to regulate the tension by lengthening or shortening the cable, and a resilient part in the cable-length.

The clamp 21 is held to the drag-link 14 near the rear end of the latter by two bolts as shown in Fig. 2, and has an upward extension by which it is pivotally connected to a link 22. The link is pivotally connected with a spring-head 23, and the latter is connected, preferably by a plurality of cylindrical springs 24, here shown as five in number although more or less in number may be used, with a similar head 25. In the form shown the heads each comprise a pair of metal plates united by rivets around which eyes formed in the ends of springs 24 are looped, as shown in Fig. 4. A rope—braided sash-weight cord will do—26 is fastened to a tie-bar 27 riveted to the head 25. This tie-bar has three holes through which the rope 26 is threaded and made fast in the manner shown in Fig. 6, which enables the length of the rope to be varied quickly. The rope is passed around a sheave 28 in a block formed of a pair of metal plates 29, spaced apart and bolted to the frame of the radiator. The rope after passing around sheave 28 is fastened to a second tie-bar 27' in the manner described for attachment to tie-bar 27. The end of a chain 30 is fastened to the tie-bar 27', which chain has been previously passed through a hole in a lock-plate 31 bolted to the dash 19. The hole in the plate is of a size and shape to allow the chain to slide through it freely, but it has a depending slot 32, into which a single link of the chain will drop edgewise. Longitudinal movement of the chain is prevented by the unfavorable position of the adjacent links. A ring 33 will preferably terminate the opposite end of the chain from the tie-bar 27' to keep the chain from accidentally coming entirely out at any time.

The operation is as follows: The device is clamped to the rear end of the drag-link and the rope passed around the sheave and shortened in attachment to the tie-bars 27 and 27' so that the ring 33 of the chain will be close to or contacting the lock-plate 31 which will leave the entire chain-length for holding spring-tensions. Then the chain is moved into the hole at the top of slot 32 and drawn toward the operator until the desired tension is placed on springs 24, to keep the front wheel in the furrow normally in contact with the land side of the furrow; then the chain is locked and the given tension held. The springs will be but partially stressed and their further capacity will allow for wheel-movements to meet irregularities in the ground-texture of the land being plowed.

Having thus fully described my invention, what I claim as new and wish to secure by Letters Patent of the United States, is—

1. The combination with a tractor having steering wheels one of which tracks the furrow in plowing and means to steer the wheels comprising a stub-axle arm, a steering arm and a link connecting said arms, of means attached to the link to influence the said furrow wheel out of a straight forward direction and toward the land side of the furrow.

2. The combination with a tractor having steering wheels one of which tracks the furrow in plowing and means to steer the wheels comprising a stub-axle arm, a steering arm and a link connecting said arms, of resilient means attached to the link to influence the said furrow wheel out of a straight forward direction and toward the land side of the furrow.

3. The combination with a tractor having steering wheels one of which tracks the furrow in plowing and means to steer the wheels comprising a stub-axle arm, a steering arm and a link connecting said arms, of means attached to the link and adapted to be set at a predetermined force to influence the said furrow wheel out of a straight forward direction and toward the land side of the furrow, and resilient means in said last means to make the force a yielding one.

4. The combination with a farm tractor having steering wheels one of which tracks the furrow in plowing and having means to steer the wheels comprising a drag-link, of a sheave at the forward portion of the tractor, a cord around the sheave removably secured at one end to the drag-link, means to hold the other end of the cord at predetermined tensions at the will of the plowman and resilient means making the tension elastically yielding.

5. The combination with a farm tractor having steering wheels one of which tracks the furrow in plowing and having means to steer the wheels comprising a drag-link, of a sheave secured to the forward portion of the tractor, a cord around the sheave, a clamp removably securing one end of the cord to the drag-link, elastic means in the cord between the sheave and clamp, a chain at the other end of the cord, tie-bars adjustably joining the cord to the chain and elastic means and a plate having a hole through which the chain is passed said hole having a slot receiving a link of the chain edgewise to lock the chain.

In witness whereof I have hereunto set my hand at Indianapolis, Indiana, this 25th day of August, 1919.

WALTER A. JACKSON.